US006996910B2

(12) United States Patent
Liao

(10) Patent No.: US 6,996,910 B2
(45) Date of Patent: Feb. 14, 2006

(54) LASER LEVELING DEVICE FOR GENERATING PARALLEL LINES

(76) Inventor: Ying Chou Liao, P.O.Box 63-99, Taichung (TW) 406

(*) Notice: Subject to any disclaimer, the term of this patent is extended or adjusted under 35 U.S.C. 154(b) by 0 days.

(21) Appl. No.: 10/652,601

(22) Filed: Aug. 29, 2003

(65) Prior Publication Data

US 2005/0268474 A1    Dec. 8, 2005

(51) Int. Cl.
*G01C 1/00*    (2006.01)
(52) U.S. Cl. .................... 33/285; 33/227; 33/283
(58) Field of Classification Search .......... 33/285–286, 33/227–228, 276–278, 281, DIG. 21, 283
See application file for complete search history.

(56) References Cited

U.S. PATENT DOCUMENTS 5,539,990 A * 7/1996 Le ............................. 33/283
5,621,975 A * 4/1997 Rando ......................... 33/227
5,864,956 A * 2/1999 Dong .......................... 33/227
5,971,810 A * 10/1999 Taylor ........................ 439/675
6,739,062 B1 * 5/2004 Jan et al. .................... 33/286
2001/0037579 A1   11/2001 Akers

* cited by examiner

*Primary Examiner*—Christopher W. Fulton
*Assistant Examiner*—Tania Courson
(74) *Attorney, Agent, or Firm*—Charles E. Baxley

(57) ABSTRACT

A laser leveling device includes a laser instrument having a base rotatably received in a cavity of a housing and having a light emitting device to generate a light beam, such as a line-shaped light beam. One or more batteries may be used to energize the light emitting device. The light beam generated by the light emitting device may be rotated relative to the housing when the light emitting device of the laser instrument is rotated relative to the housing. The housing includes two conductors, and the laser instrument includes two terminals to electrically couple to the conductors of the housing when the laser instrument is rotated relative to the housing.

5 Claims, 6 Drawing Sheets

LASER LEVELING DEVICE FOR GENERATING PARALLEL LINES

BACKGROUND OF THE INVENTION

1. Field of the Invention

The present invention relates to a laser leveling device, and more particularly to a laser leveling device for generating parallel lines.

2. Description of the Prior Art

Various kinds of typical laser leveling devices have been developed and comprise a laser instrument for generating a point-shaped light beam, or a line-shaped light beam.

For example, U.S. Patent Application Publication No. U.S. 2001/0037579 A1 to Akers discloses one of the typical laser leveling devices which comprise a laser instrument slidably supported on a post section with a mounting section, for allowing the laser instrument to slide up and down along the post section, and to generate the light beams to different levels.

The conventional or typical laser leveling devices fail to disclose a laser instrument rotatably supported on a housing, to generate parallel lines.

The present invention has arisen to mitigate and/or obviate the afore-described disadvantages of the conventional laser leveling devices.

SUMMARY OF THE INVENTION

The primary objective of the present invention is to provide a laser leveling device for generating parallel lines.

In accordance with one aspect of the invention, there is provided a laser leveling device comprising a housing including a cavity formed therein, a laser instrument including a base rotatably received in the cavity of the housing, and including a light emitting device disposed therein for generating a light beam, and means for energizing the light emitting device of the laser instrument to generate the light beam. The light beam generated by the light emitting device of the laser instrument may be rotated relative to the housing when the light emitting device of the laser instrument is rotated relative to the housing.

The housing includes two conductors disposed therein, the laser instrument includes two terminals disposed on the base to electrically couple to the conductors of the housing respectively. The energizing means includes at least one battery disposed in the housing and coupled to the conductors of the housing respectively. The housing includes a switch provided thereon to control an energizing of the battery to the laser instrument.

The conductors of the housing are preferably annular conductors disposed in the cavity of the housing, or the terminals of the laser instrument are preferably annular terminals disposed around the base of the laser instrument.

The housing includes a peripheral shoulder formed therein to engage with the base of the laser instrument, and to stably retain the laser instrument in the housing. The housing further includes at least one bubble leveling vial attached thereon.

The housing includes an upper portion having a recess formed therein and communicating with the cavity of the housing, and the laser instrument includes an enlarged head having a lower portion rotatably received in the recess of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
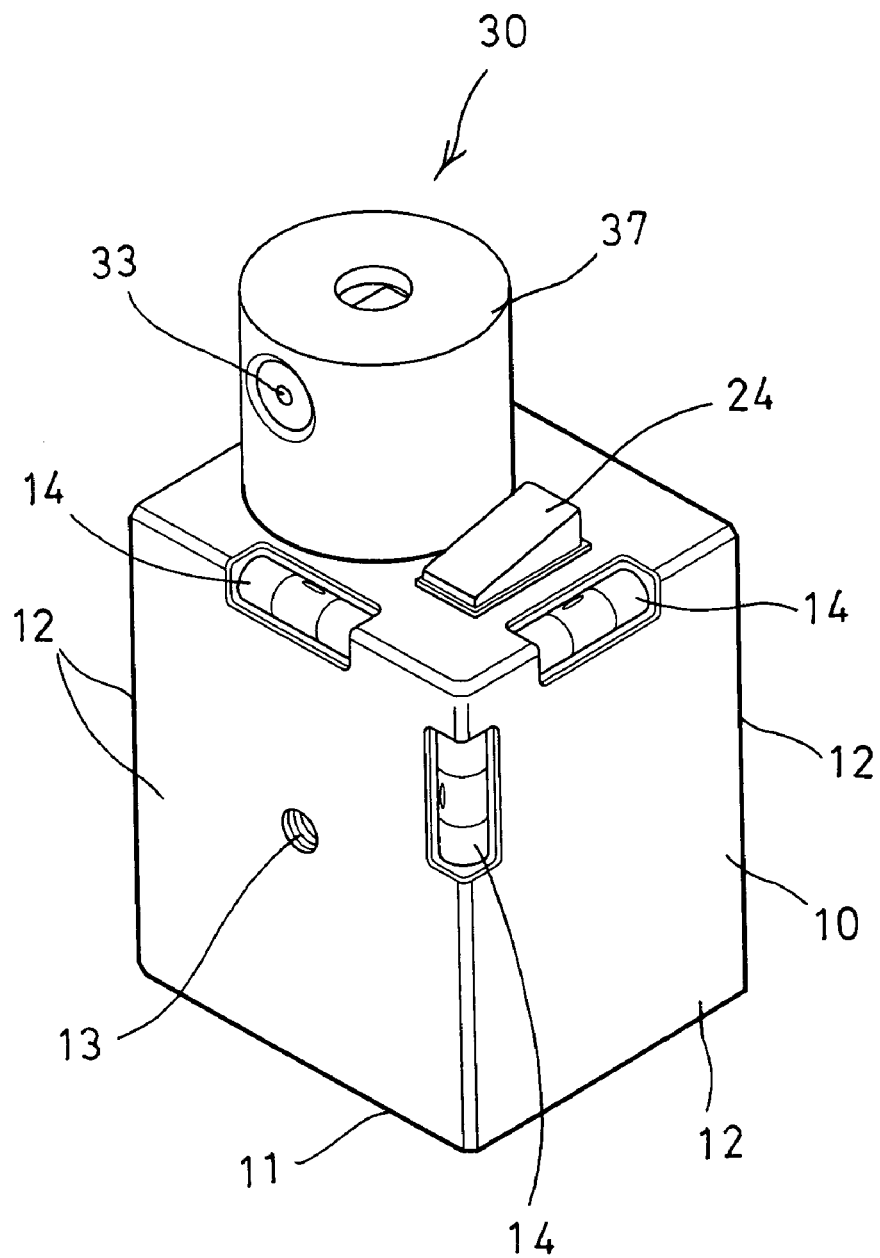
FIG. 1 is a perspective view of a laser leveling device in accordance with the present invention.
Figure 2:
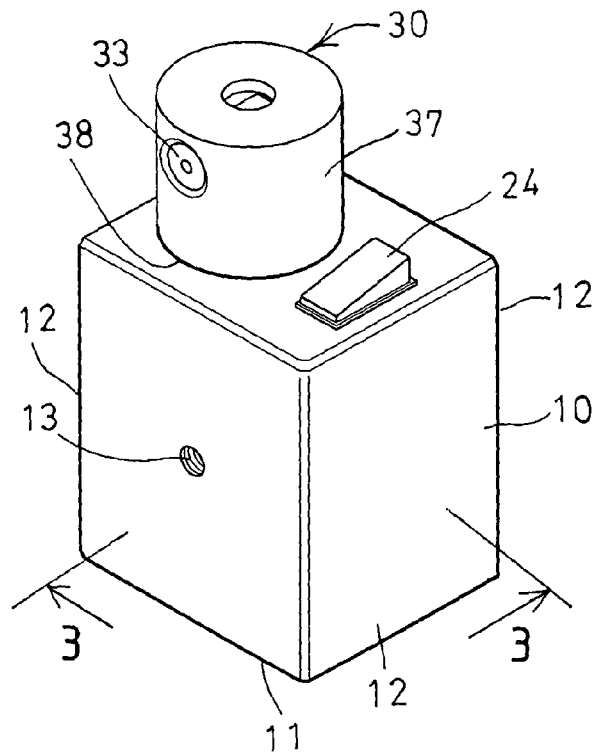
FIG. 2 is a perspective view similar to FIG. 1, illustrating a simplified configuration of the laser leveling device.

Referring to the drawings, and initially to FIGS. 1–4, a laser leveling device in accordance with the present invention comprises a housing 10 including a flat bottom surface 11 and one or more flat side surfaces 12 formed therein for allowing the housing 10 to be stably and selectively disposed and supported on the ground or any other supports 90 (FIGS. 6, 7) or tables (not shown) or the like with either of the flat surfaces 11, 12 thereof.

The housing 10 includes a hole, such as a screw hole 13 formed in either of the flat surfaces 11, 12 thereof, for threading with such as fasteners 91, and for solidly securing the housing 10 onto the supports 90 (FIGS. 6, 7) or the tables (not shown) or the like. The housing 10 may further include one or more bubble leveling vials 14 attached thereon (FIG. 1).

The housing 10 includes a cylindrical cavity 15 and a recess 16 formed therein and communicating with each other (FIG. 4), and both opened toward the upper portion 17 of the housing 10; and includes a peripheral bulge 18 extended into the cylindrical cavity 15 of the housing 10 (FIG. 3), to form or define a peripheral shoulder 19 in the middle portion the cylindrical cavity 15 or of the housing 10.

Figure 3:
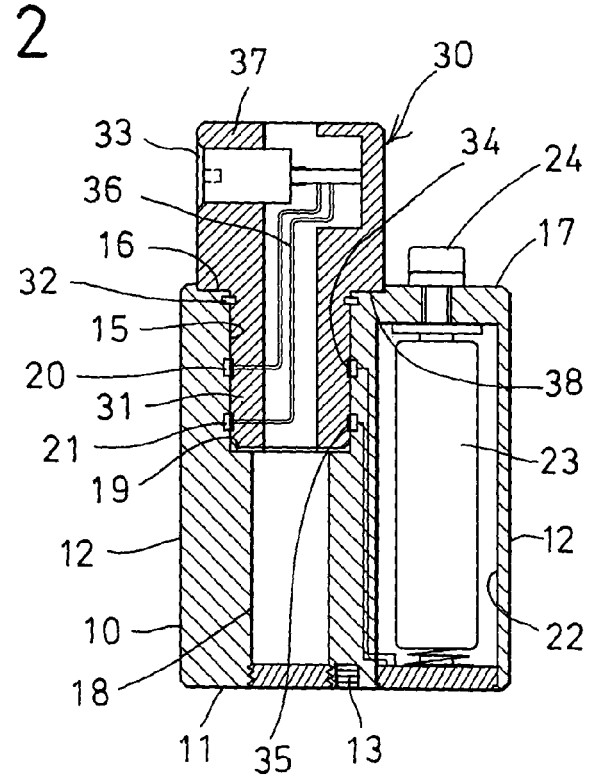
FIG. 3 is a cross sectional view of the laser leveling device, taken along lines 3—3 of FIG. 2.
Figure 4:
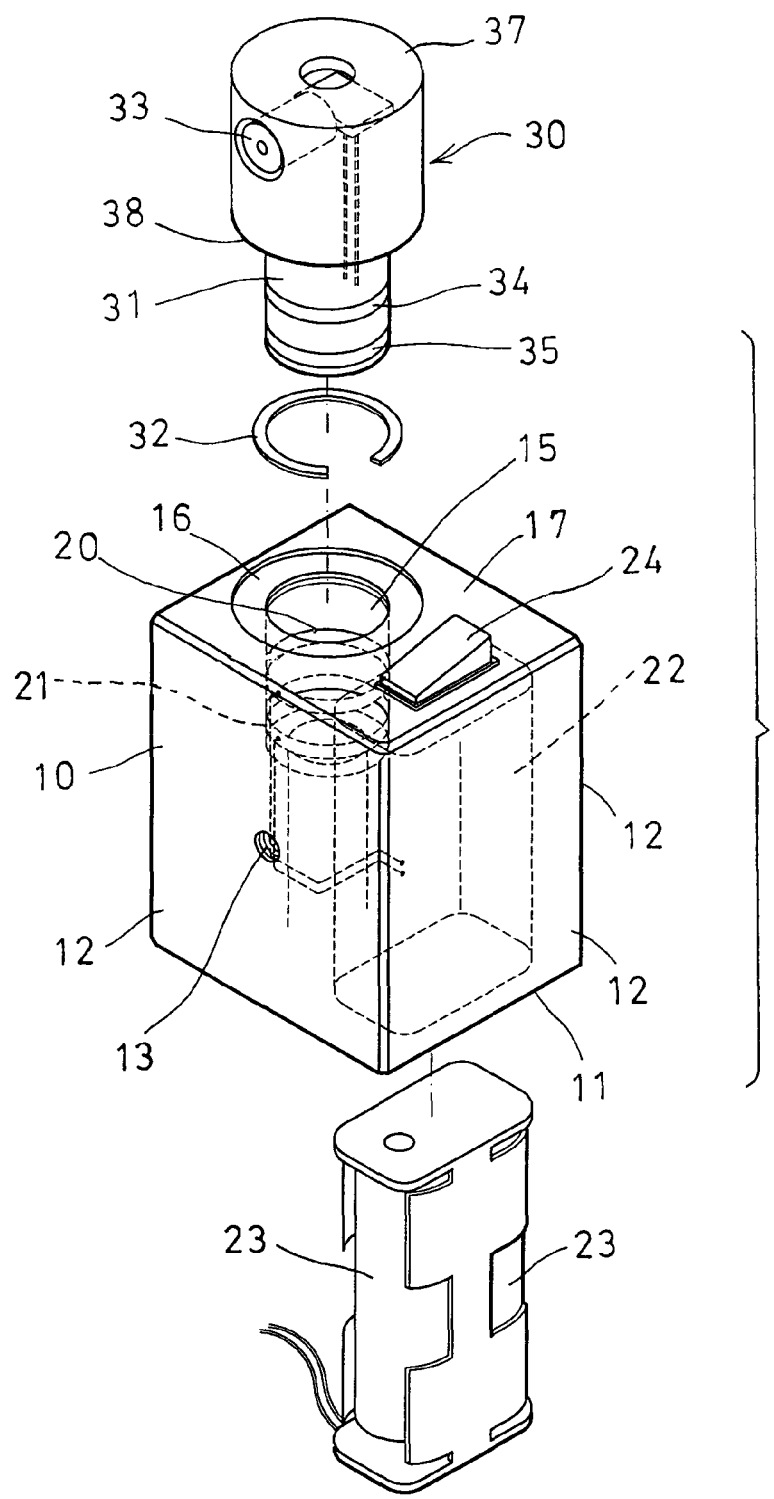
FIG. 4 is a partial exploded view of the laser leveling device.

Two conductors 20, 21, such as two peripheral or annular conductors 20, 21 are disposed in the cylindrical cavity 15 of the housing 10 and spaced away from each other (FIGS. 3, 4). The housing 10 includes a chamber 22 formed therein to receive one or more batteries 23 therein. The batteries 23 are coupled to the conductors 20, 21 respectively with the central electrode and the peripheral electrode thereof respectively.

A laser instrument 30 includes a cylindrical base 31 rotatably received in the cylindrical cavity 15 of the housing 10 with such as a retaining ring 32, and preferably engaged or engageable with the peripheral shoulder 19 of the housing 10, to allow the laser instrument 30 to be stably and rotatably retained in the housing 10, and to prevent the laser instrument 30 from moving up and down along the cylindrical cavity 15 of the housing 10.

The laser instrument 30 includes a light emitting device 33 disposed therein for generating a light beam 80 (FIGS. 6, 7) onto the wall 81 or the like, and includes two conductors or terminals 34, 35, such as two peripheral or annular terminals 34, 35 disposed or engaged onto the outer peripheral portion of the cylindrical base 31 of the laser instrument 30, for engaging with the conductors 20, 21 of the housing 10 respectively, best shown in FIG. 3.

The light emitting device 33 of the laser instrument 30 may be electrically coupled to the terminals 34, 35 respectively with one or more wires or cables 36, and the terminals 34, 35 of the laser instrument 30 are engaged with and electrically coupled to the conductors 20, 21 of the housing 10 respectively, and the conductors 20, 21 are electrically coupled to the batteries 23, for allowing the laser instrument 30 to be energized by the batteries 23. The light beam 80 generated by the light emitting device 33 of the laser instrument 30 may thus be rotated relative to the housing 10 when the laser instrument 30 is rotated relative to the housing 10.

It is preferable that the laser instrument 30 includes an enlarged head 37 formed or provided on top thereof, to form or define a peripheral shoulder 38 in the bottom portion thereof (FIGS. 3, 4) which is to be rotatably received in the recess 16 of the housing 10, in order to further stably retain or secure the laser instrument 30 to the housing 10.

It is to be noted that the terminals 34, 35 of the laser instrument 30 and the conductors 20, 21 of the housing 10 may be continuously and electrically coupled together respectively when the laser instrument 30 is rotated relative to the housing 10, such that the laser instrument 30 may be rotated freely relative to the housing 10. The housing 10 includes a switch 24 provided thereon to control the energizing of the batteries 23 to the laser instrument 30.

It is further to be noted that the terminals 34, 35 of the laser instrument 30 may include only a point or a short segment for continuously and electrically coupling to the peripheral or annular conductors 20, 21 of the housing 10, for allowing the terminals 34, 35 of the laser instrument 30 and the conductors 20, 21 of the housing 10 to be continuously and electrically coupled together when the laser instrument 30 is rotated relative to the housing 10.

On the contrary, the conductors 20, 21 of the housing 10 may include only a point or a short segment for continuously and electrically coupling to the peripheral or annular terminals 34, 35 of the laser instrument 30, such that the terminals 34, 35 of the laser instrument 30 and the conductors 20, 21 of the housing 10 may also be continuously and electrically coupled together when the laser instrument 30 is rotated relative to the housing 10.

Figure 6:
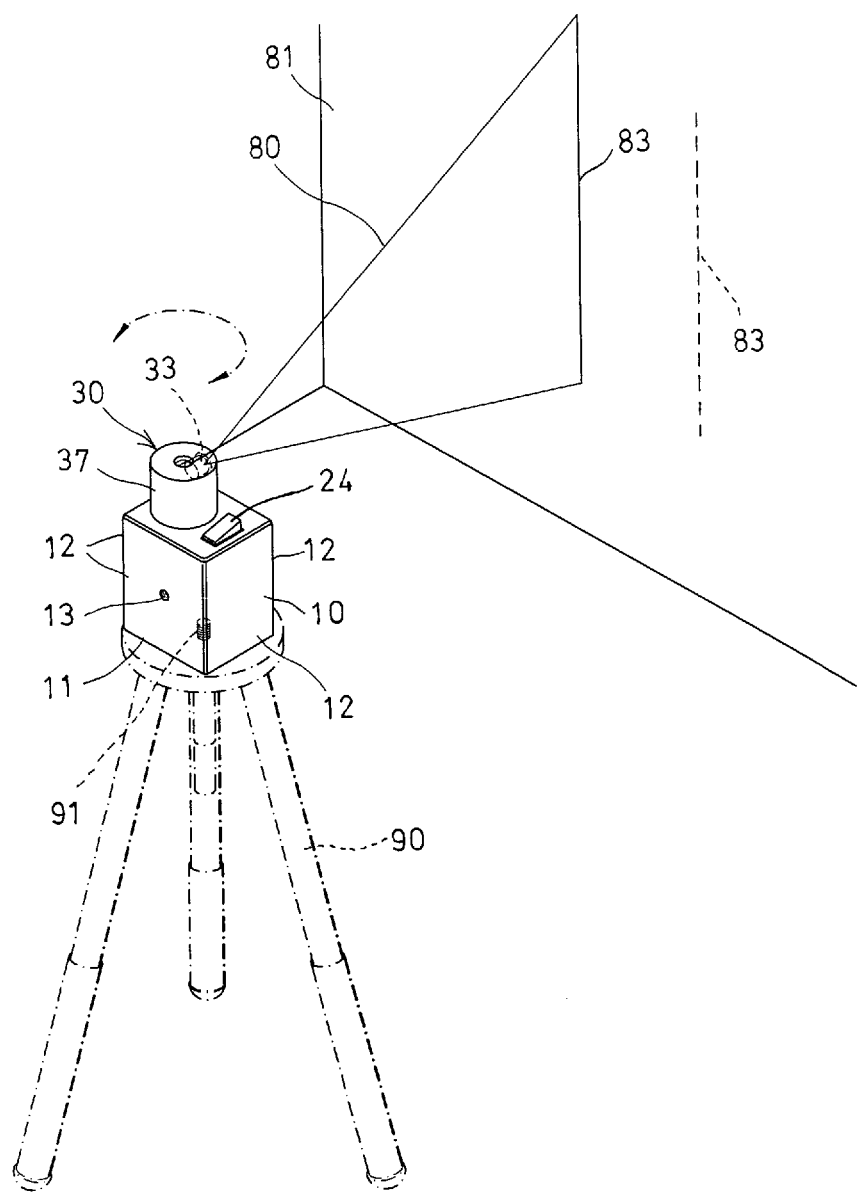
FIG. 6 is a perspective view similar to FIG. 5, illustrating the operation of the laser leveling device to generate horizontal and parallel lines.
Figure 7:
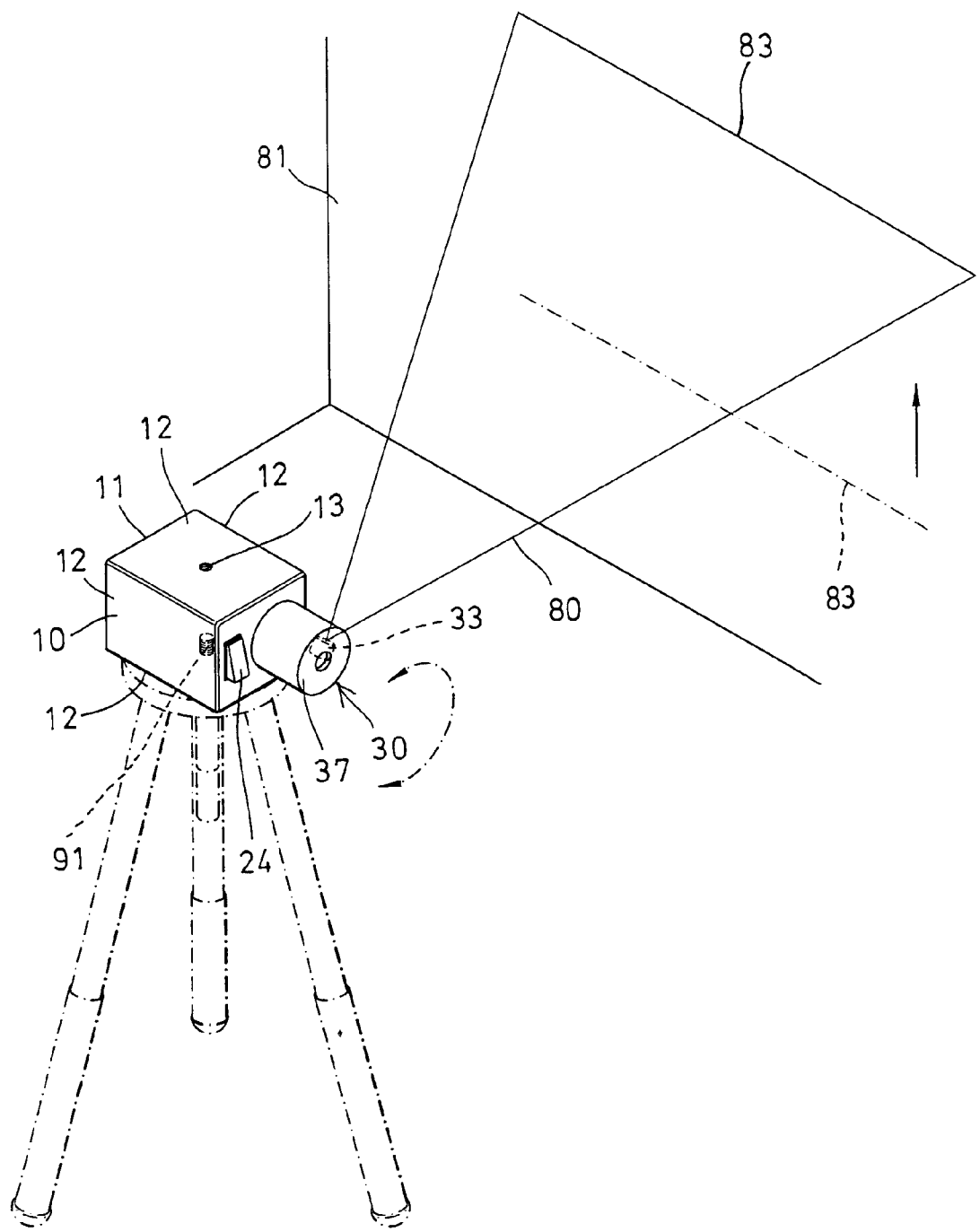

As shown in FIGS. 6, 7, the light beams 80 generated by the light emitting device 33 of the laser instrument 30 may include a point shape (not shown), a line shape, or a cross shape or the like. However, it is preferable that the light emitting device 33 of the laser instrument 30 may generate a line-shaped light beam 80, such that a number of parallel lines 83 may be formed on the wall 81 or the like when the laser instrument 30 is rotated relative to the housing 10.

Figure 5:
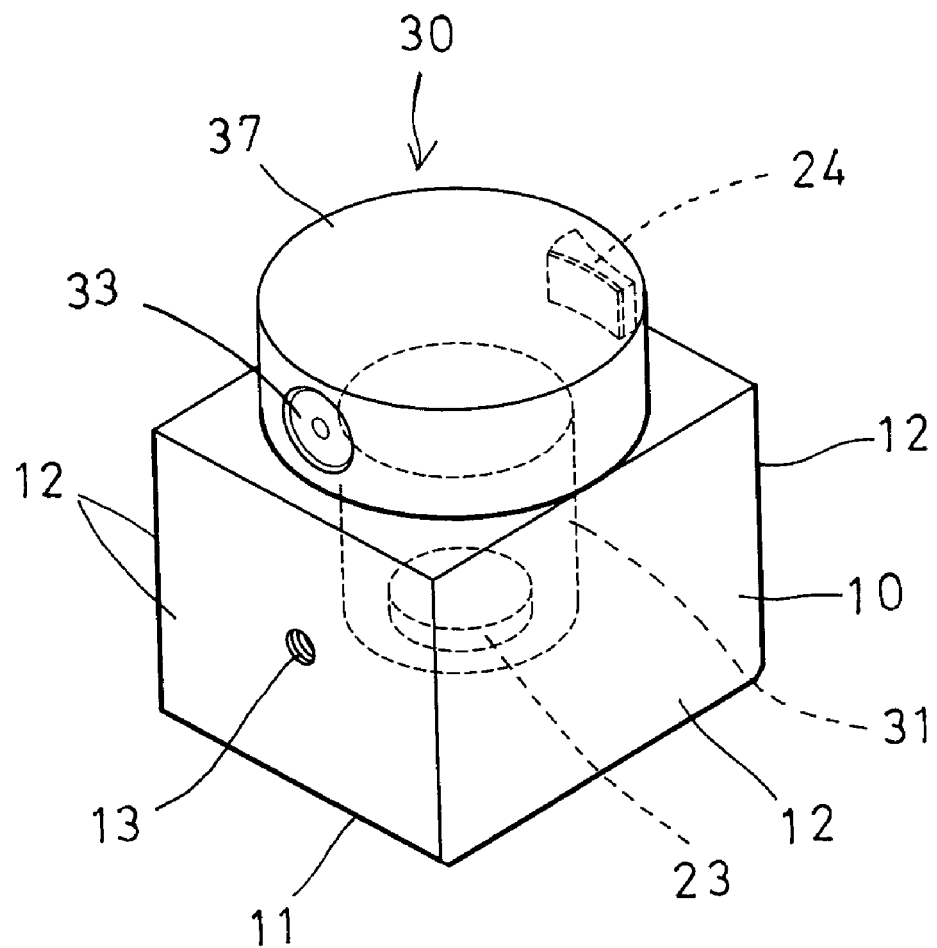
FIG. 5 is a perspective view illustrating the operation of the laser leveling device to generate vertical and parallel lines.

Referring next to FIG. 5, alternatively, the batteries 23 may be directly received in the base 31 of the laser instrument 30 in order to energize the light emitting device 33, and the switch 24 may be directly attached to the laser instrument 30, to control the energizing of the batteries 23 to the light emitting device 33 of the laser instrument 30. The laser instrument 30 may also be rotated freely relative to the housing 10.

Accordingly, the laser leveling device in accordance with the present invention may be used for generating parallel lines.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A laser leveling device comprising:
   a housing including a cavity formed therein, and including two annular conductors disposed in said cavity of said housing, and including a switch provided thereon,
   a laser instrument including a base rotatably received in said cavity of said housing, and including a light emitting device disposed therein for generating a light beam, and including two annular terminals disposed around said base to electrically couple to said annular conductors of said housing respectively, and
   means for energizing said light emitting device of said laser instrument to generate the light beam, said energizing means including at least one battery disposed in said housing and coupled to said conductors of said housing respectively, and
   the light beam generated by said light emitting device of said laser instrument being rotatable relative to said housing when said light emitting device of said laser instrument is rotated relative to said housing, and said switch of said housing being provided to control an energizing of said at least one battery to said laser instrument.

2. The laser leveling device as claimed in claim 1, wherein said housing includes a peripheral shoulder formed therein to engage with said base of said laser instrument, and to stably retain said laser instrument in said housing.

3. The laser leveling device as claimed in claim 1, wherein said housing includes an upper portion having a recess formed therein and communicating with said cavity of said housing, and said laser instrument includes an enlarged head having a lower portion rotatably received in said recess of said housing.

4. The laser leveling device as claimed in claim 1, wherein said housing further includes at least one bubble leveling vial attached thereon.

5. The laser leveling device as claimed in claim 1, wherein the light beam generated by said light emitting device of said laser instrument is a line-shaped light beam to form parallel lines when said light emitting device of said laser instrument is rotated relative to said housing.

* * * * *